(12) United States Patent
Rizvi et al.

(10) Patent No.: US 6,199,110 B1
(45) Date of Patent: Mar. 6, 2001

(54) PLANNED SESSION TERMINATION FOR CLIENTS ACCESSING A RESOURCE THROUGH A SERVER

(75) Inventors: Hasan Rizvi, Foster City; Ekrem Soylemez, Redwood Shores; Juan R. Loaiza, San Carlos, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 08/866,204

(22) Filed: May 30, 1997

(51) Int. Cl.[7] ................................................. G06F 17/30
(52) U.S. Cl. ............................. 709/227; 707/202; 707/10
(58) Field of Search ............................ 395/182.02, 800, 395/180, 600; 707/202, 204, 10; 714/4, 6; 709/105, 200, 227, 228, 229

(56) References Cited

U.S. PATENT DOCUMENTS

| 3,444,528 | 5/1969 | Lovell et al. ................. 340/172.5 |
| 4,868,832 | * 9/1989 | Marrington et al. ............... 713/330 |
| 5,157,663 | 10/1992 | Major et al. ...................... 371/9.1 |
| 5,179,660 | * 1/1993 | Devany et al. .................. 709/219 |
| 5,535,326 | * 7/1996 | Baskey ......................... 395/182.02 |
| 5,544,313 | * 8/1996 | Shachnai et al. ................ 707/104 |
| 5,566,225 | * 10/1996 | Haas ................................. 455/423 |
| 5,566,297 | 10/1996 | Devarakonda et al. ...... 395/182.13 |
| 5,596,720 | 1/1997 | Hamada, et al. ............. 395/200.03 |
| 5,633,999 | 5/1997 | Clowes et al. ............... 395/182.04 |
| 5,652,908 | * 7/1997 | Douglas ............................ 395/800 |
| 5,666,479 | * 9/1997 | Kashimoto ....................... 395/180 |
| 5,696,895 | 12/1997 | Hemphill et al. ............ 395/182.02 |
| 5,734,896 | 3/1998 | Rizvi, et al. ..................... 395/618 |
| 5,784,630 | 7/1998 | Saito et al. ........................ 395/800 |
| 5,796,934 | * 8/1998 | Bhanot ........................... 395/182.02 |
| 5,796,999 | * 8/1998 | Azagury ........................... 395/600 |
| 5,832,483 | 11/1998 | Barker .................................. 707/8 |
| 5,850,507 | 12/1998 | Ngai, et al. ..................... 395/182.14 |
| 5,862,362 | * 1/1999 | Somasegar et al. ........... 395/500.42 |
| 5,867,713 | 2/1999 | Shrader et al. .................... 395/712 |

OTHER PUBLICATIONS

"CODA: A Highly Available File System for a Distributed Workstation Environment", Mahadev Satyanarayanan, IEEE Transactions on Computers, vol. 39, No. 4, pp. 447–459, Apr. 1990.*

"Scalable, Secure, and Highly Available Distributed File Access", Mahadev Satyanarayanan, IEEE Transactions on Computers, vol. 23 5, pp. 9–21, May 1990.*

* cited by examiner

Primary Examiner—Dung C. Dinh
(74) Attorney, Agent, or Firm—Hickman Palermo Troung & Becker, LLP; Carl L. Brandt

(57) ABSTRACT

A method and apparatus are provided for passing a client from a first server to which the client was connected for accessing a resource, to a second server for accessing the resource. While executing, the first server ceases to respond to the client. After the client detects that the first server has ceased to respond to the client, the client is automatically connected with the second server that has access to the resource. After automatically connecting the client, the client accesses the resource through the second server. The client stores information about the state of the session with the first server so that processing can continue where it left off after the client connects with the second server. The client may be pre-connected to the second server prior to the failure of the first server to reduce the latency caused by switching in response to a failure. The second server may be configured to pre-parse the commands that the client issues to the first server to further reduce the latency associated with switching to the second server.

57 Claims, 6 Drawing Sheets

PLANNED SESSION TERMINATION FOR CLIENTS ACCESSING A RESOURCE THROUGH A SERVER

FIELD OF THE INVENTION

The present invention relates to planned session termination mechanisms, and more specifically, to a method and apparatus for implementing a planned session termination for clients accessing a resource through a server.

BACKGROUND OF THE INVENTION

A typical client-server database system includes a client, a database server, and a database. The client portion includes two main components, a database application and a client driver interface. The database application issues database language commands, such as SQL (Structured Query Language) commands, and provides an interface to a user through a keyboard, screen, and pointing devices such as a mouse. The client driver interface, on the other hand, provides the connection and communication interface between the client and the database server.

A connection is a communication pathway between a client and a database server and a specific connection between a client and a database server is termed a database session. The database server responds to the database language commands sent from the client by executing database operations for accessing and manipulating a physical database. A logical unit of work that is comprised of one or more database language commands is referred to as a transaction.

Contained within the database server is the session state data that reflects the current transaction state of the database session. To initiate a database session, human intervention is required to manually log onto a database application. The logging on process establishes a new database session by connecting a client with a database server.

Normally, the database session lasts from the time the user connects until the time the user disconnects or exits the database application. However, if a database session failure occurs, the connection between the client and the database server is lost. Once the database session fails, the user will observe a visible interrupt in his service as access to the database is terminated. To continue accessing the database, the user must reconnect a client to an active database server. This requires human intervention to manually log back onto the system to establish a new database session.

Besides requiring human intervention to manually log back onto the system, the failure of a database session creates other significant problems to the user. Because the logon process creates a new database session, all previous transactions that were not complete at the time of the failure are lost. Thus the user must resubmit all lost transactions once the connection to the database is reestablished.

Based on the foregoing, it is desirable to provide a mechanism for handling the failure of a database session without requiring someone to perform manual reconnection steps. Additionally, it is also desirable for users not to lose session state data on the occurrence of a database session failure.

SUMMARY OF THE INVENTION

A method and apparatus are provided for passing a client from a first server to which the client was connected for accessing a resource, to a second server for accessing the resource. While executing, the first server ceases to respond to the client. After the client detects that the first server has ceased to respond to the client, the client is automatically connected with the second server that has access to the resource. After automatically connecting the client, the client accesses the resource through the second server.

The client stores information about the state of the session with the first server so that processing can continue where it left off after the client connects with the second server. The client may be pre-connected to the second server prior to the failure of the first server to reduce the latency caused by switching in response to a failure. The second server may be configured to pre-parse the commands that the client issues to the first server to further reduce the latency associated with switching to the second server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for implementing an automatic failover mechanism for a resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
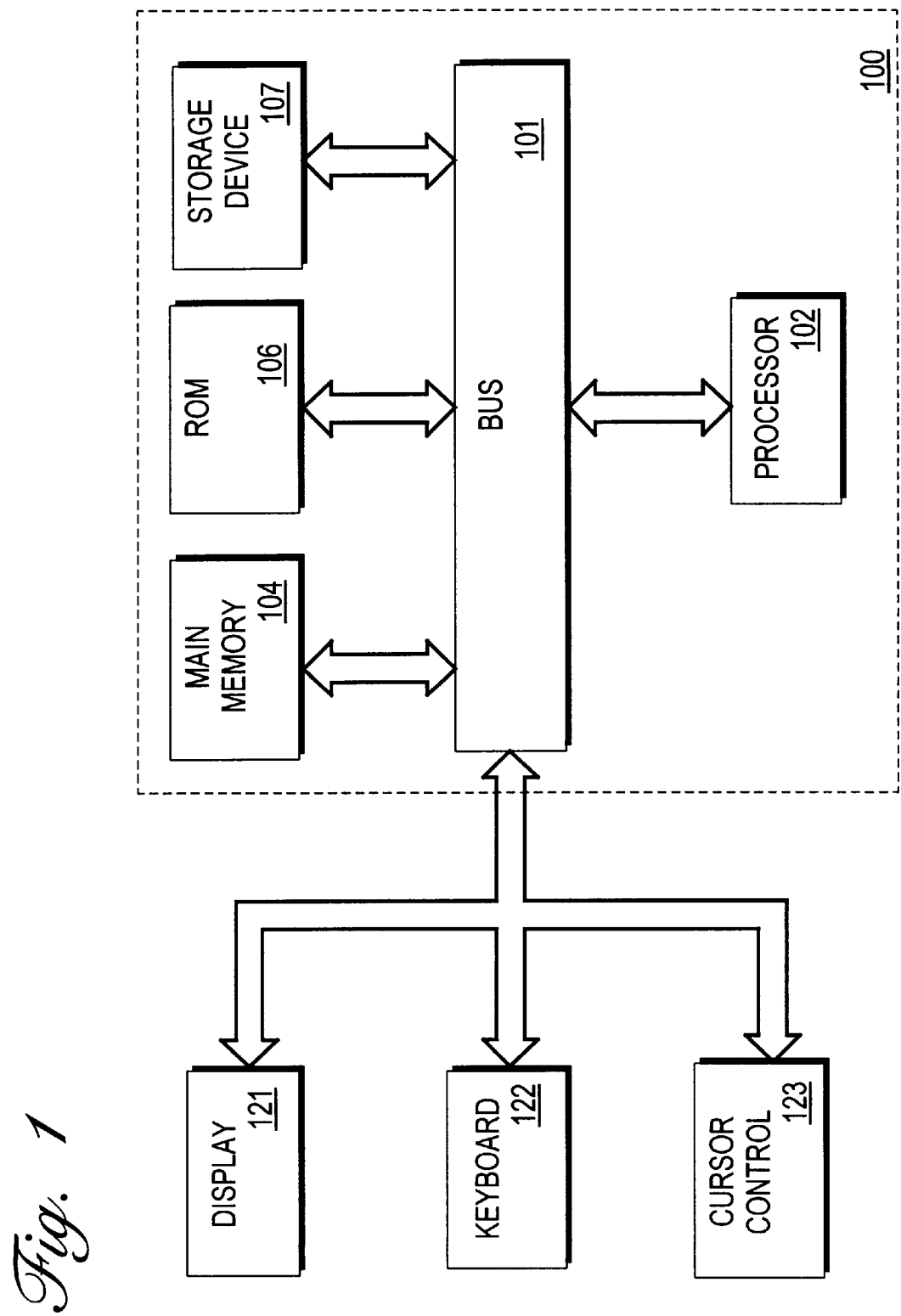
FIG. 1 is a block diagram of a computer system that may be used to implement the present invention.

Referring to FIG. 1, the computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The present invention is related to the use of computer system 100 to perform an automatic failover when a database server failure occurs. According to one embodiment, computer system 100 initiates an automatic failover in response to processor 102 executing sequences of instructions contained in memory 104. Execution of the sequences of instructions contained in memory 104 causes processor 102 to perform the steps that will be described hereafter. In alternative embodiments, hard-wired circuitry may be used in place of or in combination with software instructions to implement the present invention. Thus, the present invention is not limited to any specific combination of hardware circuitry and software.

AUTOMATIC FAILOVER

An automatic failover system is a mechanism that can detect a failed connection between a client and a database server and automatically and transparently create a new database session by reconnecting the client to an active database server. The automatic failover mechanism can eliminate the burden of manually re-logging onto the database system whenever a database session failure occurs. In addition, the automatic failover mechanism can provide a method for completing commands and transactions that were interrupted by the database session failure.

Figure 2:
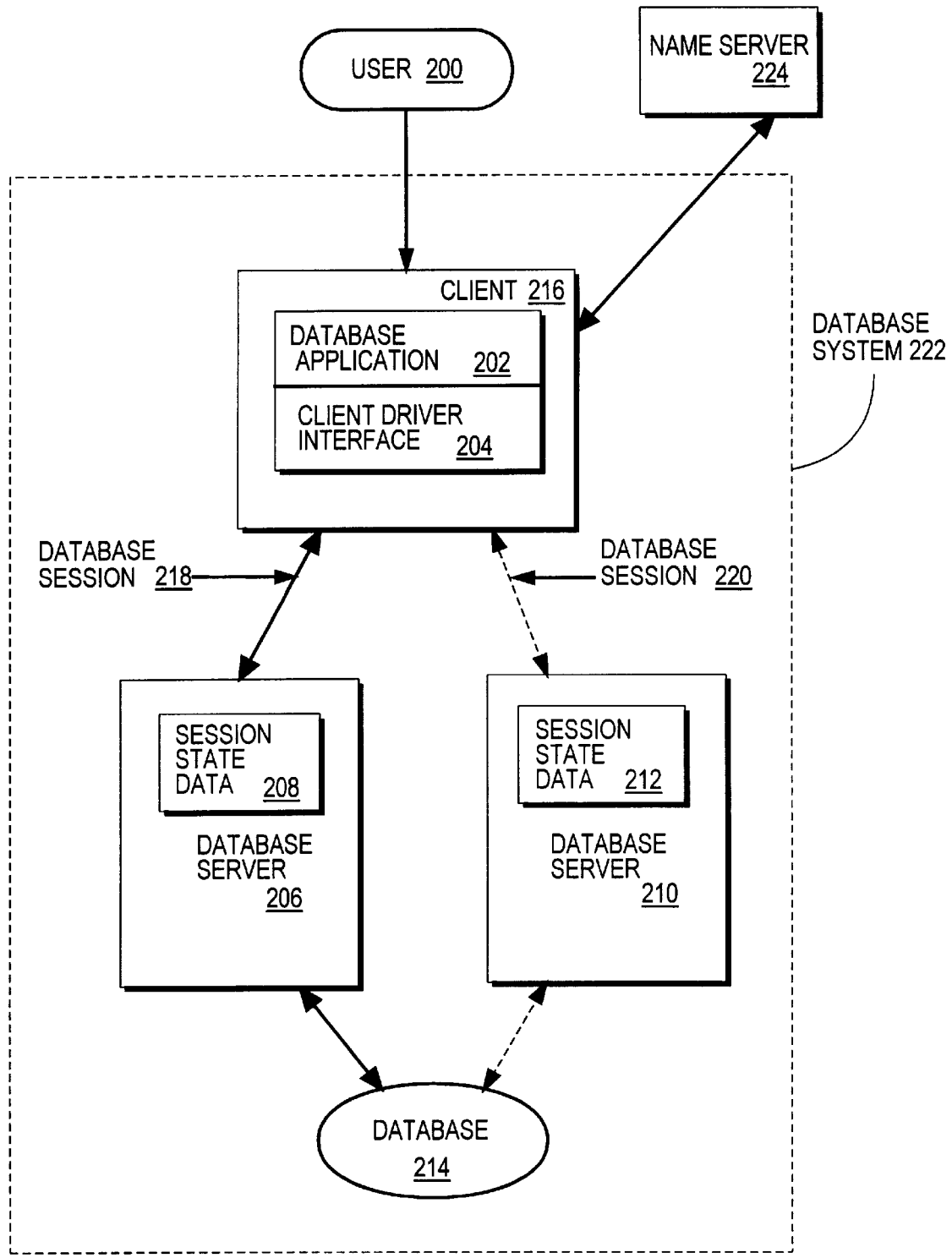
FIG. 2 is a block diagram of a database system in which a client is connected to a database server to provide access to a database.

FIG. 2 is an illustration of a typical database system 222 that supports automatic failover according to one embodiment of the invention. Database server 206 and database server 210 represent two database servers that can provide access to a particular database 214. Client 216 includes database application 202 and client driver interface 204. Database application 202 provides user 200 an interface into database 214 by generating database language commands based on input from user 200 and displaying to user 200 data retrieved from database 214 in response to the database language commands.

Client driver interface 204 is connected to and communicates with database server 206 and database server 210 through database session 218 and database session 220, respectively. Session state data 208 and session state data 212 are respectively contained within database server 206 and database server 210 and reflect the current command and transaction state of database session 218 and database session 220 respectively. Names server 224 contains active database server addresses that may be used by clients to access database 214.

AUTOMATIC FAILOVER SEQUENCE

Figure 3:
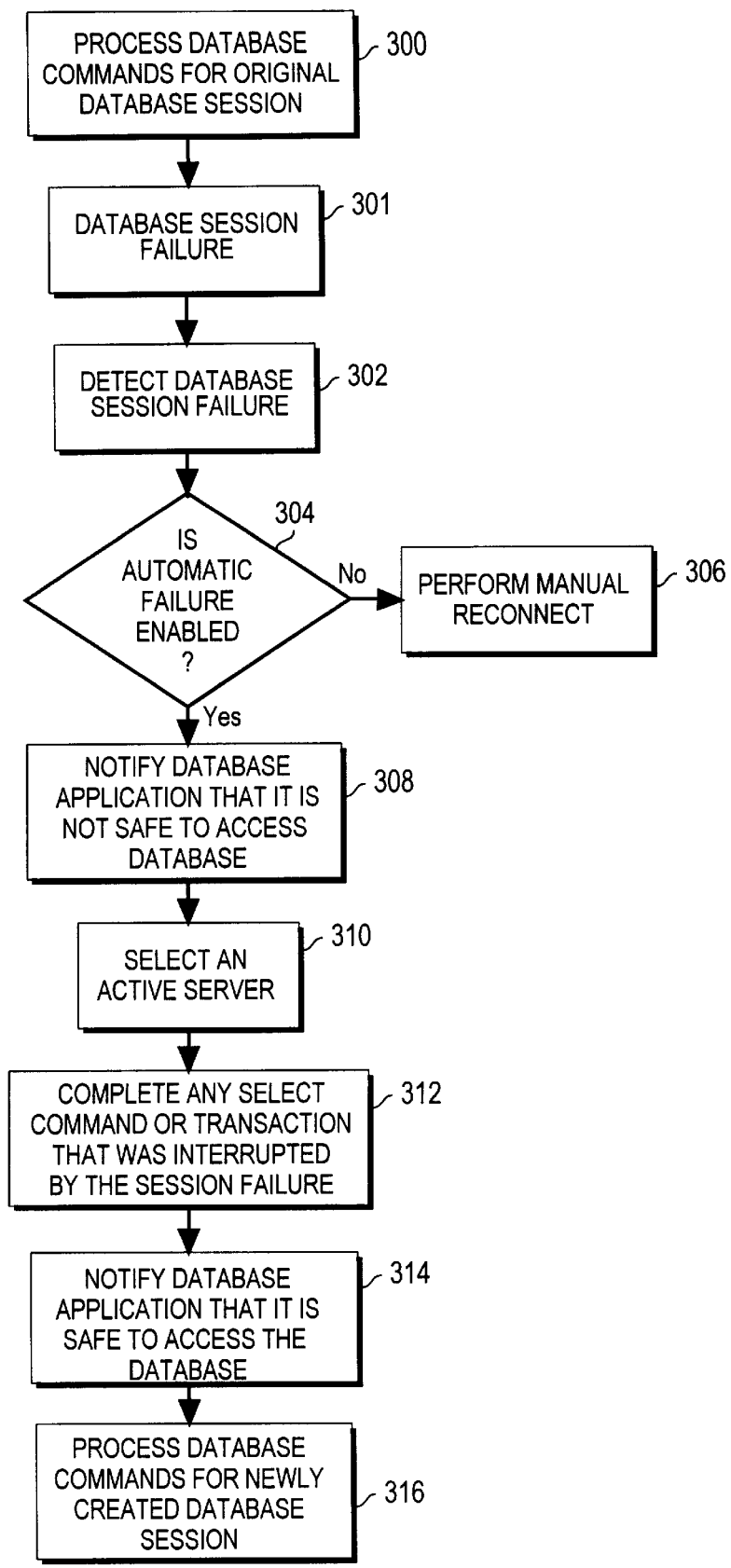
FIG. 3 is a flow chart illustrating steps performed in response to a database server failure according to an embodiment of the invention.

FIG. 3 is a flow diagram illustrating the manner in which an automatic failover mechanism may be implemented according to one embodiment of the invention. According to one embodiment as described in FIG. 3, the configuration of database system 222 before an occurrence of a database session failure is such that client 216 only has access to database 214 by way of database server 206 and database session 218. User 200 accesses database 214 by interacting with the user interface of client 216, causing client 216 to submit database language commands through database session 218.

At step 300, client driver interface 204 is configured to process database language commands that correspond to input from user 200. Client driver interface 204 conveys these database language commands to database server 206 through database session 218. Client driver interface 204 is responsible for establishing and reestablishing the connection and communication controls for interfacing client 216 with database server 206 and, after failure of database session 218, to database server 210. In addition, client driver interface 204 is required to initialize database server 210 and session state data 212 if database session 218 fails.

For example, in one embodiment, client driver interface 204 maintains a record of the state of every command or transaction sent over session 218 that has not completed. When database session 218 fails, this record enables client driver interface 204 to transfer and reestablish the state of interrupted commands or transactions onto database server 210 and session state data 212. Once database server 210 and session state data 212 are initialized, client driver interface 204 can cause the interrupted commands or transactions to continue processing, or at least attempt to continue processing, by communicating commands through database session 220.

At step 301, a failure of database session 218 occurs and the connection between client 216 and database server 206 is lost. At step 302, client driver interface 204 detects the failure of database session 218.

Various techniques may be used to allow client driver interface 204 to detect a failure of database session 218. For example, according to one embodiment, client driver interface 204 asserts a callback request when initiating the connection to database server 206. The connection from client driver interface 204 to database server 206 is through database session 218. The callback request notifies client driver interface 204 when database session 218 fails.

In an alternate embodiment, client driver interface 204 detects a failure of database session 218 by maintaining a timer which times-out when database server 206 fails to respond within a specified amount of time. Client driver interface 204 may then verify that database session 218 actually failed and that the interface did not time-out for another reason.

At step 304, client driver interface 204 verifies that automatic failover is enabled. In one embodiment, user 200 can select whether or not automatic failover is performed on the failure of database session 218. If user 200 has not selected automatic failure and database session 218 fails, not only will manual steps will be required to log back onto database system 222, but session state data 208 will also be lost. Otherwise, in one embodiment, if user 200 enables automatic failover, in step 308 client driver interface 204 notifies database application 202 that it is not safe to continue accessing database 214 through session 218. Client driver interface 204 may also cause user 200 to be notified that database session 218 has failed and that an automatic failover is being performed.

At step 310, client driver interface 204 selects database server 210 to reestablish access to database 214. Various techniques may be used for selecting a database server that allows access to the same resource (database 214) that was being accessed during the failed session.

In one embodiment, a names server 224 is used to determine an appropriate database server to use after a session 218 fails. Names server 224 maintains a list of active servers that can be connected to access to database 214. After obtaining the address of database server 210 from names server 224, client driver interface 204 automatically connects to database server 210 creating database session 220.

When selecting an active database server after the failure of database session 218, client driver interface 204 is not required to choose a different database server (database server 210), from the previously connected database server (database server 206). Although database system 222 depicts client 216 connecting to a different database server (database server 210) when database session 218 fails, database server 206 and database server 210 may actually be the same database server, where database server 210 represents database server 206 after the failure. Thus, when database session 218 fails, client driver interface 204 may choose to reconnect to database server 206 if client driver interface 204 determines that database server 206 is currently active. Database server 206 will be available for reconnecting client 216 to database 214 if, for example, session 218 failed independent of database server 206. Alternatively, database server 206 may become available for reconnecting client 216 to database 214 after recovering from a failure.

For example, client driver interface 204 is connected to database server 206 through database session 218. User 200, although still logged on to database system 222, ceases to access database 214 for some period of time. During this period of time, a backup of database 214 is initiated causing database session 218 to fail. Before user 200 returns to access database 214, the backup of database 214 is completed. When user 200 begins to access database 214, client driver interface 204 may identify database server 206 as active. Client driver interface 204 may then establish database session 218 by reconnecting client 216 to database server 206.

In another embodiment, client driver interface 204 selects database server 210 from a pool of database servers that have access to database 214. The pool of "backup" servers may be established, for example, when user 200 initially logs on. Client driver interface 204 then automatically performs the necessary steps to connect to database server 210 through database session 220. The connection pool can reduce the overhead required in connecting client driver interface 204 to a new database server after the occurrence of a database session failure.

In yet another embodiment, client driver interface 204 is connected with both database server 206 and database server 210 when user 200 initially logs on. The database application 202 interacts with the database 214 through database server 206 over session 218. When session 218 fails, database server 206 then switches to database connection 220 that has already been established. As shall be described in greater detail hereafter, commands issued to database server 206 in session 218 may be pre-parsed in database server 210 to further reduce the overhead associated with switching from database server 206 to database server 210.

At step 312, any select command or transaction that was interrupted by the failure of database session 218 continues processing. In one embodiment, client driver interface 204 maintains a record of the current select commands and transactions being performed. This record provides client driver interface 204 the ability to continue processing any select command or transaction that was interrupted by the failure of database session 218. By replicating the interrupted select commands and transactions on database server 210 once database session 220 is established, client driver interface 204 can continue processing any interrupted select commands or transactions. Because client driver interface 204 can automatically resubmit any interrupted select command or transaction, the process can be transparent to user 200 as manual steps will not be required to resubmit the information.

SELECT OPERATION RECOVERY

Select commands provide users the ability to selectively retrieve specific categories of information or data from a database. Ordinarily, a select command returns the requested data in rows that correspond to the specific attributes of the select command. For example, in the select command "select * from t1 where t1.c1=100," the specific attributes of the select command return all rows of data from table t1 where the column 1 of table t1 is equal to 100.

Because the information in a database is constantly changing, a user cannot normally be guaranteed to receive the same data from one select command to the next, even if both select commands contain the same select attributes. Thus, results returned in response to execution of a select command reflect a particular snapshot of the database (i.e. the database at a specific instance in time).

Typically, whenever a select command is executed, a timestamp or sequence number is used to determine the specific snapshot or state of the database from which data will be retrieved during the execution of the select command. This database timestamp represents a specific state of the database and allows a database server to retrieve consistent data, even as information in the database is modified.

The timestamp used during the processing of one select command can also be used by a database sever to retrieve the same information when executing subsequent select commands. However, although using the same database timestamp to select separate executions of a select statement guarantees that the two executions return the same information, the order in which rows are returned cannot be guaranteed. In other words, the row order of data returned by a select command is not deterministic.

Figure 4:
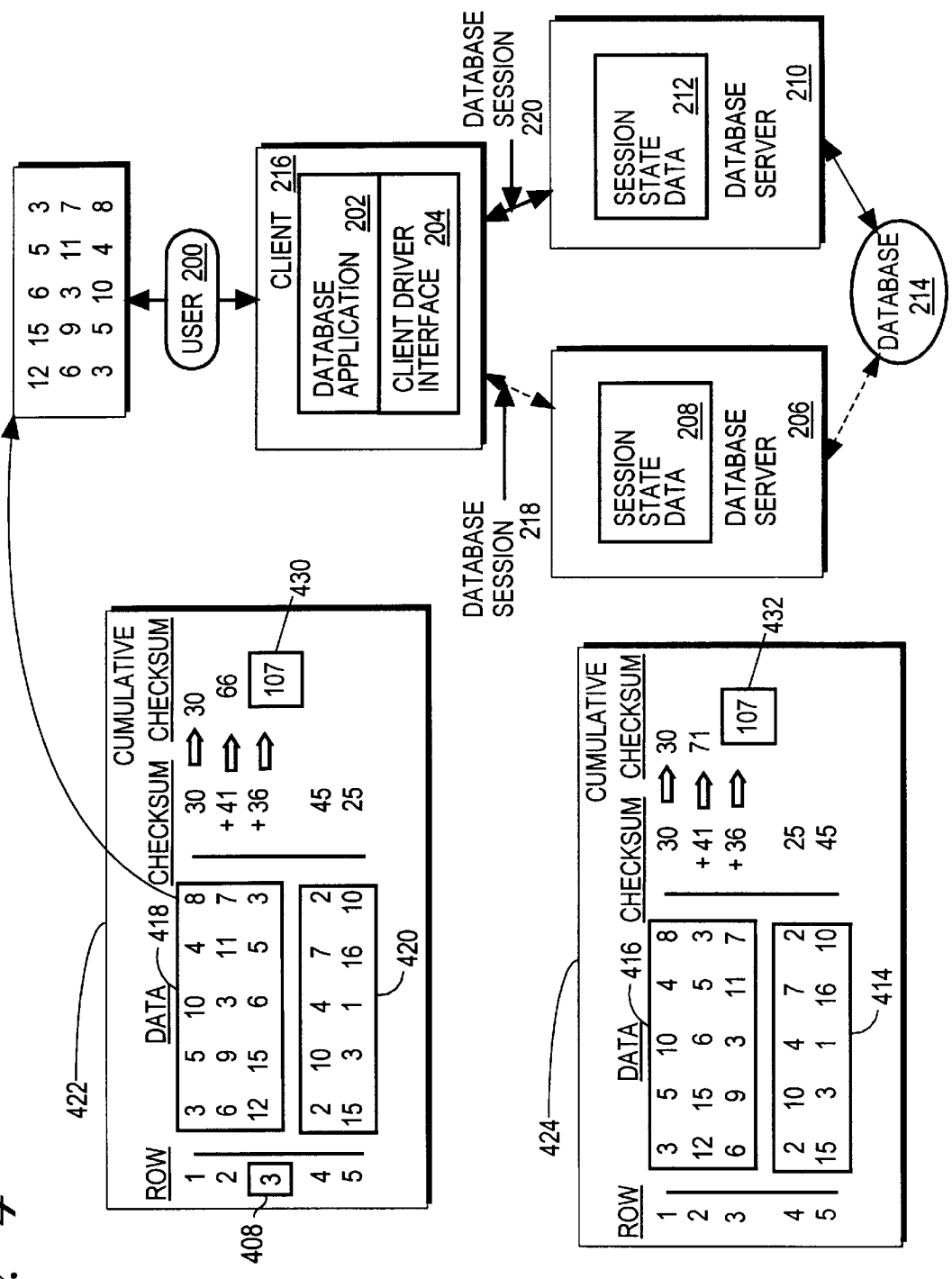
FIG. 4 is a diagram illustrating how checksums can be utilized for completing select commands that were interrupted by a database session failure according to an embodiment of the invention.

To continue processing an interrupted select command, a client must be able to determine which rows of data were previously received from the failed database session, and whether the ordering of rows from a subsequent execution of the select command will enable the client to continue processing from the point of interruption. FIG. 4 illustrates one embodiment in which checksums can be utilized to enable a client to continue processing an interrupted select command. This view is similar to that of FIG. 2, and like reference numerals are employed to refer to like components.

According to one embodiment, whenever a client requests a select command to be executed by a database server, the database server returns to the client a database timestamp that reflects the snapshot of the database used to process the particular select command. The database timestamp is stored by the client and can be used to guarantee that a subsequent select command will return the same information as the previously executed select command, as long as both select commands employ the same select attributes.

In addition to the database timestamp, the client maintains both a row count and a cumulative row checksum. The row count indicates the number of rows successfully returned to the client in response to the initial execution of the select statement. The cumulative row checksum is a cumulative checksum of all rows successfully returned to the client. If a database session fails while executing a select command, the client uses the row count and cumulative row checksum to determine if a subsequent select command can be used to continue processing from the point of interruption.

For example, when user 200 requests the processing of a select command through database application 202, client driver interface 204 submits an initial select command to database server 206 for execution through database session 218. Database server 206 executes the select command by retrieving the requested select data from database 214 and returns to client driver interface 204 a database timestamp that reflects the snapshot of the database used during the execution of the initial select command.

Database server 206 then begins transferring rows of select data back to client driver interface 204 in response to fetch commands received from the client. As rows of select data are received from database server 206, client driver interface 204 delivers the information to user 200. As each row of select data is received and then delivered to user 200, client driver interface 204 increments a row counter and calculates a cumulative checksum.

If database session 218 fails and the initial select command is interrupted before client driver interface 204 receives all of the select data, client driver interface 204 connects to database server 210 through database session 220 and attempts to continue processing the select command from the point of interruption. Once connected to database server 210 through database session 220, client driver interface 204 resubmits the select command to database server 210 along with the stored database timestamp.

The database server 210 executes the select command using a snapshot of the database that corresponds to the timestamp. As the resubmitted select command is executed and rows of data are fetched from database server 210, client driver interface 204 counts the number of returned rows and a maintains a second cumulative checksum. When the number of rows returned equals the number of rows previously returned, client driver interface 204 compares the second cumulative checksum with the previously stored cumulative checksum to determine whether the rows returned in response to the re-execution of the select statement are the same as the rows that were previously returned to the user. If so, then the results returned by the resubmitted select command are the same as the results previously returned by the initial select command. Thus, the results of the resubmitted select command may continue to be fetched to continue processing from the point of interruption.

As shown in FIG. 4, data 422 represents the initial select command that was interrupted by the failure of database session 218 while attempting to return five rows of select command data to client driver interface 204. Data 418 represents the three rows of data that were returned to client driver interface 204, before database session 218 failed and data 420 represents the two rows of data that had not been returned to client driver interface 204 before the failure of database session 218. Cumulative checksum 430 is the cumulative row checksum of data 418 and row count 408 is the number of rows of data that were returned to client driver interface 204 before database session 218 failed.

Data 424 depicts the resubmitted select command using the stored database timestamp and the order of rows returned to client driver interface 204 from database server 210. Data 416 represents the first three rows of data and data 414 represent the last two rows of data returned to client driver interface 204 after connecting to database session 210. Cumulative checksum 432 represents the cumulative row checksum of data 416, corresponding to the first three rows of data returned to client driver interface 204 after executing the resubmitted select command.

In the current example, although the row order of data 418 does not match the row order of data 416, cumulative checksums 430 and 432 are equal. Therefore, client driver interface 204 is assured that data 414 represents the two rows of data (data 420), that were not returned to client driver interface 204 before database session 218 failed. Thus, in this particular instance, client driver interface 204 can continue processing the interrupted select command and return to user 200 only those rows of data that were not previously returned when database session 218 failed.

However, in one embodiment, if cumulative checksums 430 and 432 are not equal, client driver interface 204 cannot continue processing the select command from the point that database session 218 failed. In this case, client driver interface 204 causes database server 210 to redeliver all rows of data from the resubmitted select command. Client driver interface 204 then returns the complete set of select data back to user 200.

In yet another embodiment, when cumulative checksums 430 and 432 are not equal, client driver interface 204 notifies user 200 that a database session failure occurred and that the interrupted select command cannot be completed. User 200 must then resubmit another select command with the corresponding attributes.

TRANSACTION PROCESSING RECOVERY

Referring again to FIG. 3, when a transaction is interrupted by the failure of database session 218, client driver interface 204 attempts to continue processing the interrupted transaction. In one embodiment, client driver interface 204 automatically causes database 214 to be rolled back to a state that was valid before database session 218 failed and the transaction was interrupted. Client driver interface 204 can then perform the necessary steps to continue processing the transaction. As mentioned above, pre-parsing may be used to reduce the amount of time required to complete any select command or transaction that was interrupted by failure of database session 220. Pre-parsing in described in detail below.

In another embodiment, savepoints are used to reduce the amount that client driver interface 204 must roll back database 214 to obtain a valid database state after the failure of database session 218. A savepoint is an intermediate marker that can be used to divide transactions into smaller components. At each savepoint, the database system flushes current transaction information to database 214. Thus, when a transaction is interrupted, client driver interface 204 need only rollback the transaction to the most resent savepoint and continue processing the interrupted transaction from the latest savepoint state. This can significantly reduce the extra processing that is required in rolling back the entire transaction and then resubmitting the whole transaction for processing.

In an alternate embodiment, database 214 is rolled back to a valid state whenever database session 218 fails. User 200 is notified that database session 218 failed and that a rollback has occurred. User 200 can then resubmit all select commands and transactions that were interrupted by failure of database session 218.

At step 314, client driver interface 204 notifies database application 202 that it is safe to continue accessing database 214. Client driver interface 204 may also cause user 200 to be notified of the status or results of the automatic failover event.

For example, in one embodiment, user 200 is notified that an automatic failover occurred and that user 200 may continue interfacing with database 214.

In another embodiment, user 200 is signaled or notified that a rollback of database 214 occurred and that one or more commands and/or instructions, need to be resubmitted.

In yet another embodiment, user 200 is signaled or notified of the status of the interrupted select command or transaction, once client 216 is connected to database server 210. The status, for example, may contain information as to whether the transaction completed successfully or that user 200 must resubmit part or all of the interrupted transaction. Additionally, the status may contain information as to whether the client driver interface 204 could successfully complete the select command or whether user 200 must resubmit the select command request.

At step 316, the automatic failover sequence is complete as database session 220 now connects client 216 to database server 210, enabling user 200 to continue accessing database 214 by causing client 216 to submit database language commands through session 220.

PRE-PARSING AT A BACKUP SERVER

Figure 5:
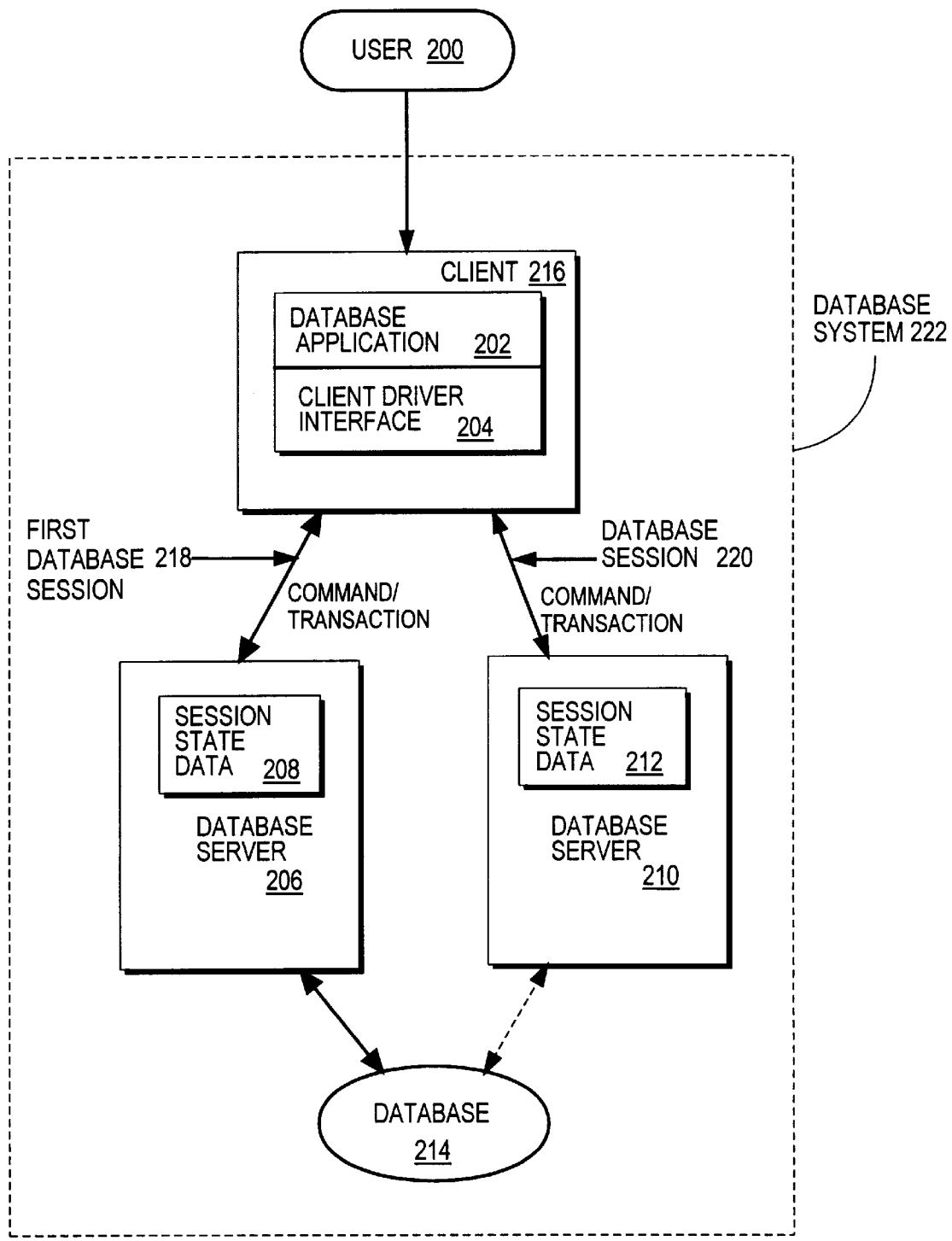
FIG. 5 is a block diagram of a database system in which the technique of pre-parsing is implemented to enable the completion of commands and transactions that were interrupted by a database session failure according to an embodiment of the invention.

Pre-parsing is a technique that can reduce the overhead associated with connecting to an active database server and completing a command or transaction that was interrupted by the failure of a database session. FIG. 5 is an illustration of one embodiment that supports pre-parsing at a backup server. This view is similar to that of FIG. 2, and like reference numerals are employed to refer to like components.

The pre-parse mechanism requires that client 216 be connected to both database server 206 and database server 210. The connection from client 216 to database server 206 and database server 210 is through database session 218 and database session 220, respectively. Client driver interface 204 may establish these connections when user 200 initially logs on.

According to one embodiment, whenever client driver interface 204 submits a command or transaction to database server 206, client driver interface 204 causes the same command or transaction to be parsed, but not executed, on database server 210. This allows database server 210 and session state data 212 to reflect the identical state of database server 206 and session state data 208 respectively. Thus, when database session 218 fails, client driver interface 204 can continue processing any interrupted command or transaction on database server without having to resubmit the commands or transactions through database session 220.

PLANNED SESSION TERMINATION

While the automatic failover techniques described above have been described with reference to unintentional database session failures, these techniques can also be used for planned termination of database sessions. For example, according to one embodiment, if a system administrator desires to shutdown a server to provide for the maintenance, upgrade or load balancing of a database system, the system administrator can mark the server for termination and cause the server to terminate its connections with any or all clients. Once the connection between a client and the marked server is terminated, the client will detect a session failure and proceed to execute an automatic failover, as if an unintentional database session failure had occurred. After the automatic failover completes, the client will be associated with an active server through a new session.

The planned session termination mechanism provides for a controlled switching of clients from one server to another. In addition, the switching from one server to another is transparent to users as commands and transactions do not have to be interrupted.

Figure 6:
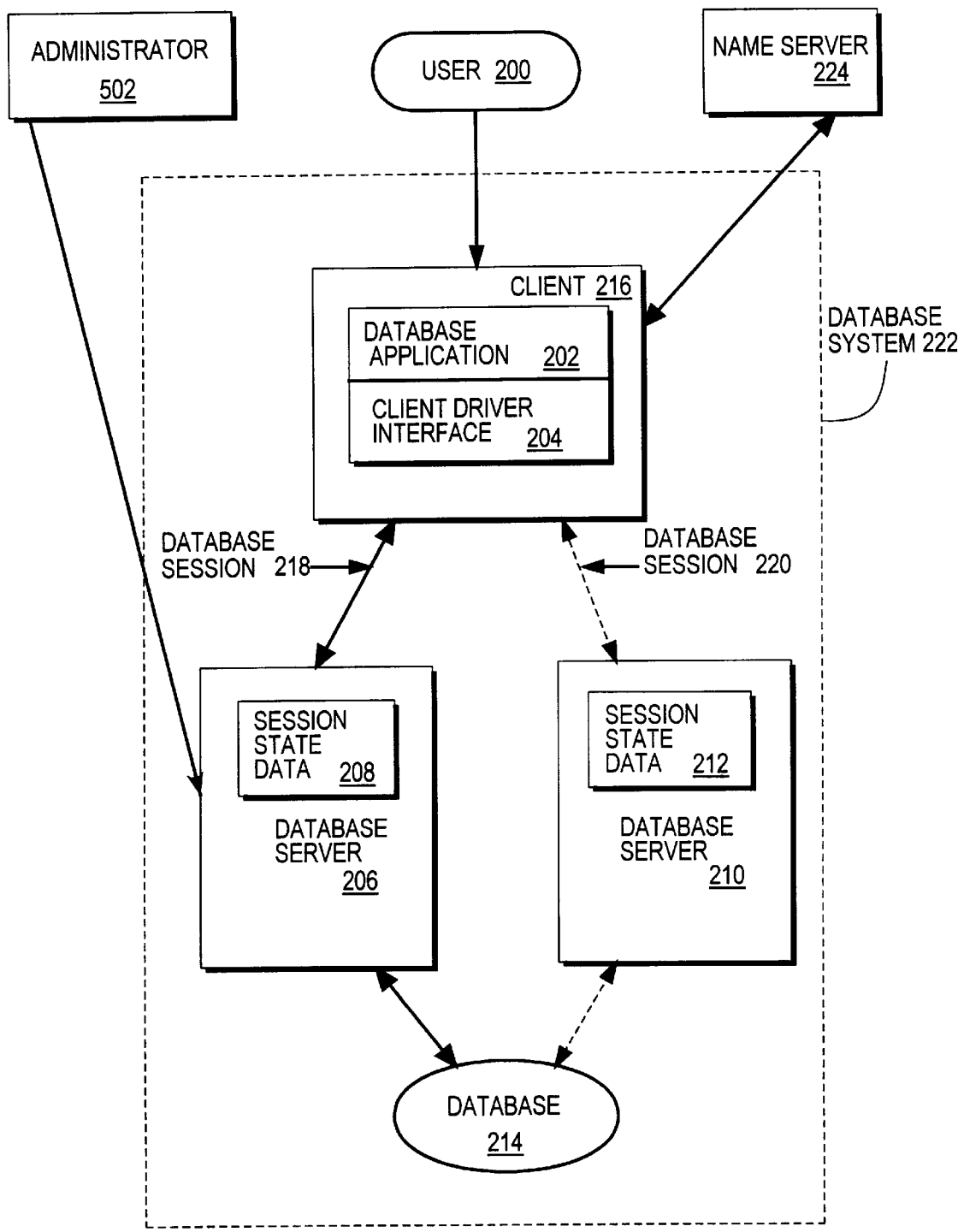
FIG. 6 is a block diagram of a database system in which an administrator controls which database server a client is connected to for accessing a database.

FIG. 6 illustrates a database system 222 that supports planned session termination according to one embodiment of the invention. This view is similar to that of FIG. 2, and like references numerals are employed to refer to like components. Administrator 502 controls the execution and processing of instructions by database server 206. When administrator 502 wishes to switch client 216 from database server 206 to database server 210, administrator 502 instructs database server 206 to terminate its connection with client driver interface 204. When database sever 206 stops responding to client driver interface requests, client driver interface 204 assumes that database session 218 has failed and proceeds to execute an automatic failover.

For example, administrator 502 may cause database server 206 to stop accepting database requests from client driver interface 204. Thus, when client driver interface 204 attempts to access database 214 through database server 206, client driver interface 204 concludes that database session 218 has failed. Client driver interface 204 then performs the necessary steps to execute an automatic failover.

Various strategies may be used to determine when to cease responding to sessions. For example, administrator 502 may cause database server 206 to:

complete all transactions and commands sent from client driver interface 204 before refusing to accept any more transactions or commands from client driver interface 204;

complete only active transactions and commands sent from client driver interface 204 before refusing to accept any more transactions or commands from driver interface 204;

stop accepting database requests from client driver interface 204 in a specified period of time;

halt the execution of active database transactions and commands from client driver interface 204; or halt the execution of active database transactions and commands from client driver interface 204 after a specified period of time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for passing a client from a first server to which the client was connected for accessing a resource to a second server, the method comprising the steps of:

while said first server is executing, causing said first server to cease responding to said client while continuing to allow said server to respond to one or more other clients;

automatically connecting said client with the second server, wherein said second server has access to said resource; and after automatically connecting said client, said client accessing said resource through said second server.

2. The method of claim 1 further comprising the step of said client detecting that said first server has ceased to respond to said client.

3. The method of claim 1 wherein the step of causing said first server to cease responding to said client includes the steps of:

receiving a message requesting said first server to stop accepting transactions and commands sent from said client; and in response to receiving said message, said first server refusing to accept transactions from said client.

4. The method of claim 3 further comprising the step of said message including data that causes said first server to complete all transactions and commands sent from said client and already received by said first server.

5. The method of claim 3 further comprising the step of said message including data that causes said first server to complete all currently active transactions and commands sent from said client and received by said first server.

6. The method of claim 3 further comprising the step of said message including data that causes said first server to begin refusing to accept transactions and commands sent from said client after a threshold period of time.

7. The method of claim 1 wherein the step of causing said first server to cease responding to said client includes the steps of:

an administrator causing said first server to halt the execution of any active database transaction or command sent from said client and received by said first server, wherein said administrator is a process that can communicate with said first server; and said first server halting the execution of any active database transaction or command sent by said client and received from said first server.

8. The method of claim 3 further comprising the step of said message including data that causes said first server to halt the execution of any active database transaction or command sent from said client and received by said first server after a threshold period of time.

9. The method of claim 1 wherein:

said connection between said client and said first server constitutes a session;

said session has a state that changes in response to said first server executing commands sent by said client to said first server using said session; and said method further comprises the step of pre-parsing said commands on said second server prior to causing said first server to cease to respond to said client.

10. The method of claim 1 further comprising the step of pre-connecting said client to said second server prior to causing said first server to cease to respond to said client.

11. The method of claim 2 further comprising the step of said client selecting and establishing a second connection with said second server after said first server ceases to respond to said client.

12. The method of claim 1 further comprising the step of said client causing said second server to roll back said resource to a valid state.

13. The method of claim 1 wherein:

said first server is executing a select command when said first server ceases to respond to said client; and the method further comprises the step of said client causing said second server to complete execution of said select command after said client is connected to said second server.

14. The method of claim 1 wherein:

said client is causing said first server to execute a transaction when said first server ceases to respond to said client; and said client causes said second server to complete execution of said transaction after said client connects to said second server.

15. The method of claim 1 wherein:

the first server is connected to the client through a session;

the method includes the steps of maintaining values that reflect a state of said session at both said client and said first server; and said client communicating said values to said second server after connecting to said second server.

16. The method of claim 1 wherein:

said client is causing said first server to execute a transaction when said first server ceases to respond to said client; and said client causes said resource to be rolled back to a savepoint, wherein said savepoint represents an intermediate point in the execution of said transaction.

17. The method of claim 16 further comprising the step of said client causing said second server to complete the execution of said transaction from said savepoint after said client connects to said second server.

18. The method of claim 1 further comprising the steps of:

said client causing said first server to execute a database instruction when said first server ceases to respond to said client;

said client calculating a checksum based on results returned by said first server; and said client using said checksum to determine whether to cause said second server to continue executing said database instruction from where said database instruction was interrupted when said first server terminated.

19. The method of claim 18 further comprising the step of said client using said checksum to complete the execution of said database instruction from where said database instruction was interrupted when said first server ceased to respond to said client.

20. The method of claim 2 wherein:

said step of causing said first server to cease responding to said client includes the step of terminating a connection between a first database server and a database client, wherein the first database server has access to a database;

said step of detecting that said first server has ceased to respond to said client includes the step of detecting that a connection between said first database server and said database client has terminated;

said step of automatically connecting said client with a second server that has access to said resource includes the step of automatically connecting said database client with a second database server that has access to said database; and said step of said client accessing said resource through said second server includes the step of said database client accessing said database through said second database server.

21. The method of claim 2 where the step of automatically connecting said client with said second server is performed in response to causing said first server to cease responding to said client.

22. The method of claim 1 wherein:
the step of causing said first server to cease responding to said client includes the steps of
receiving a message at said first server requesting that a first connection be removed between said first server and said client; and
in response to receiving said message, said first server removing the first connection between said first server and said client;
the step of said client detecting that said first server has ceased to respond to said client includes the step of said client detecting that said first connection between said first server and said client has been removed; and
the step of automatically connecting includes the steps of
selecting a second server, wherein the second server has access to said resource; and
automatically connecting said client with said second server to establish a second connection for accessing said resource.

23. The method of claim 1 further comprising the steps of:
storing data on said client that indicates a state of execution of one or more operations executing on said first server; and
transmitting said data that indicates said state of execution of said one or more operations to said second server.

24. The method of claim 23 wherein:
the step of storing data on said client includes the step of storing information that tracks the execution of a database transaction executing on said first server; and
the step of transmitting said data includes the step of, after automatically connecting said client to said second server, transmitting said information to said second server.

25. The method of claim 1 further comprising the steps of:
storing data on said client that tracks a state of execution of one or more operations, wherein the one or more operations are being executed by said first server; and
after automatically connecting said client to said second server, using said data that is stored on said client to complete the execution of said one or more operations, wherein said one or more operations are completed using said second server.

26. A computer readable medium containing sequences of instructions for passing a client from a first server to which the client was connected for accessing a resource to a second server, the sequences of instructions including instructions for performing the steps of:
while said first server is executing, causing said first server to cease responding to said client while continuing to allow said server to respond to one or more other clients;
automatically connecting said client with the second server, wherein said second server has access to said resource; and
after automatically connecting said client, said client accessing said resource through said second server.

27. The computer readable medium of claim 26 further comprising instructions for performing the step of said client detecting that said first server has ceased to respond to said client.

28. The computer readable medium of claim 27 further comprising instructions for performing the step of said client selecting and establishing a second connection with said second server after said first server ceases to respond to said client.

29. The computer readable medium of claim 27 wherein:
said step of causing said first server to cease responding to said client includes the step of terminating a connection between a first database server and a database client, wherein the first database server has access to a database;
said step of detecting that said first server has ceased to respond to said client includes the step of detecting that a connection between said first database server and said database client has terminated;
said step of automatically connecting said client with a second server that has access to said resource includes the step of automatically connecting said database client with a second database server that has access to said database; and
said step of said client accessing said resource through said second server includes the step of said database client accessing said database through said second database server.

30. The computer readable medium of claim 27 where the step of automatically connecting said client with said second server is performed in response to causing said first server to cease responding to said client.

31. The computer readable medium of claim 26 wherein the step of causing said first server to cease responding to said client includes the steps of:
receiving a message requesting said first server to stop accepting transactions and commands sent from said client; and
in response to receiving said message said first server refusing to accept transactions from said client.

32. The computer readable medium of claim 31 further comprising sequences of instructions for performing the step of said message including data that causes said first server to complete all transactions and commands sent from said client and already received by said first server.

33. The computer readable medium of claim 31 further comprising sequences of instructions for performing the step of said message including data that causes said first server to complete all currently active transactions and commands sent from said client and received by said first server.

34. The computer readable medium of claim 31 further comprising sequences of instructions for performing the step of said message including data that causes said first server to begin refusing to accept transactions and commands sent from said client after a threshold period of time.

35. The computer readable medium of claim 31 further comprising the sequences of instructions for performing the step of said message including data that causes said first server to halt the execution of any active database transaction or command sent from said client and received by said server after a threshold period of time.

36. The computer readable medium of claim 26 wherein the step of causing said first server to cease responding to said client includes the steps of:
an administrator causing said first server to halt the execution of any active database transaction or command sent from said client and received by said server, wherein said administrator is a process that can communicate with said first server; and
said first server halting the execution of any active database transaction or command sent by said client and received from said first server.

37. The computer-readable medium of claim 26 wherein:
the step of causing said first server to cease responding to said client includes the steps of
receiving a message at said first server requesting that a first connection be removed between said first server and said client; and
in response to receiving said message, said first server removing the first connection between said first server and said client;
the step of said client detecting that said first server has ceased to respond to said client includes the step of said client detecting that said first connection between said first server and said client has been removed; and
the step of automatically connecting includes the steps of
selecting a second server, wherein the second server has access to said resource; and
automatically connecting said client with said second server to establish a second connection for accessing said resource.

38. The computer readable medium of claim 26 wherein:
said first server is executing a select command when said first server ceases to respond to said client; and
the computer readable medium further comprises instructions for performing the step of said client causing said second server to complete execution of said select command after said client is connected to said second server.

39. The computer readable medium of claim 26 wherein:
said client is causing said first server to execute a transaction when said first server ceases to respond to said client; and
said client causes said second server to complete execution of said transaction after said client connects to said second server.

40. The computer readable medium of claim 26 wherein:
the first server is connected to the client through a session;
the computer readable medium includes instructions for performing the steps of maintaining values that reflect a state of said session at both said client and said first server; and
said client communicating said values to said second server after connecting to said second server.

41. The computer readable medium of claim 26 wherein:
said client is causing said first server to execute a transaction when said first server ceases to respond to said client; and
said client causes said resource to be rolled back to a savepoint, wherein said savepoint represents an intermediate point in the execution of said transaction.

42. The computer readable medium of claim 41 further comprising instructions for performing the step of said client causing said second server to complete the execution of said transaction from said savepoint after said client connects to said second server.

43. The computer readable medium of claim 26 further comprising instructions for performing the steps:
said client causing said first server to execute a database instruction when said first server ceases to respond to said client; said client calculating a checksum based on results returned by said first server; and
said client using said checksum to determine whether to cause said second server to continue executing said database instruction from where said database instruction was interrupted when said first server terminated.

44. The computer readable medium of claim 43 further comprising instructions for performing the step of said client using said checksum to complete the execution of said database instruction from where said database instruction was interrupted when said first server ceased to respond to said client.

45. The computer readable medium of claim 26 further comprising instructions for performing the steps of:
storing data on said client that indicates a state of execution of one or more operations executing on said first server; and
transmitting said data that indicates said state of execution of said one or more operations to said second server.

46. The computer readable medium of claim 45 wherein:
the step of storing data on said client includes the step of storing information that tracks the execution of a database transaction executing on said first server; and
the step of transmitting said data includes the step of, after automatically connecting said client to said second server, transmitting said information to said second server.

47. The computer readable medium of claim 26 further comprising instructions for performing the steps of:
storing data on said client that tracks a state of execution of one or more operations, wherein the one or more operations are being executed by said first server; and
after automatically connecting said client to said second server, using said data that is stored on said client to complete the execution of said one or more operations, wherein said one or more operations are completed using said second server.

48. A method for handling a planned disconnect between a client and a predisconnect server, wherein a connection was established between said client and said predisconnect server for accessing a resource, the method comprising the steps of:
while said predisconnect server is executing, causing said predisconnect server to cease responding to said client while continuing to allow said server to respond to one or more other clients;
automatically connecting said client with a postdisconnect server that has access to said resource;
after automatically connecting to said client, said client accessing said resource through said postdisconnect server.

49. The method of claim 48, wherein said predisconnect server and said postdisconnect server are the same server.

50. The method of claim 48, wherein said predisconnect server and said postdisconnect server are different servers.

51. The method of claim 48, wherein:
while client is connected to said predisconnect server, said client causing said predisconnect server to execute one or more operations;
storing on said client data that indicates a state of execution of said one or more operations; and
after automatically connecting to said postdisconnect server, sending the data that indicates the state of execution of said one or more operations to said postdisconnect server.

52. A computer-readable medium having stored thereon sequences of instructions for handling a planned disconnect between a client and a predisconnect server, wherein a connection was established between said client and said predisconnect server for accessing a resource, the sequences of instructions including instructions for performing the steps of:

while said predisconnect server is executing, causing said predisconnect server to cease responding to said client while continuing to allow said server to respond to one or more other clients;

automatically connecting said client with a postdisconnect server that has access to said resource; after automatically connecting to said client, said client accessing said resource through said postdisconnect server.

53. The computer-readable medium of claim 52, wherein said predisconnect server and said postdisconnect server are the same server.

54. The computer-readable medium of claim 52, wherein said predisconnect server and said postdisconnect server are different servers.

55. The computer-readable medium of claim 52, further comprising instructions for performing the steps of:

while client is connected to said predisconnect server, said client causing said predisconnect server to execute one or more operations;

storing on said client data that indicates a state of execution of said one or more operations; and after automatically connecting to said postdisconnect server, sending the data that indicates the state of execution of said one or more operations to said postdisconnect server.

56. A method for completing a transaction after intentionally dropping a first connection that was established between a client and a first server for accessing a resource, the method comprising the steps of:

performing a first portion of the transaction on the first server;

causing the first server to drop the first connection between the first server and the client;

detecting that the first connection between said first server and said client has been dropped;

automatically establishing a second connection between said client and a second server that has access to said resource; and performing a second portion of the transaction on the second server to complete the transaction, wherein performance of the first portion of the transaction includes performance of at least some operations that are not performed by the second portion of the transaction.

57. A computer-readable medium having stored thereon sequences of instructions for completing a transaction after intentionally dropping a first connection that was established between a client and a first server for accessing a resource, the sequences of instructions including instructions for performing the steps of:

performing a first portion of the transaction on the first server;

causing the first server to drop the first connection between the first server and the client;

detecting that the first connection between said first server and said client has been dropped;

automatically establishing a second connection between said client and a second server that has access to said resource; and performing a second portion of the transaction on the second server to complete the transaction, wherein performance of the first portion of the transaction includes performance of at least some operations that are not performed by the second portion of the transaction.

* * * * *

UNITED STATES PATENT AND TRADEMARK OFFICE
CERTIFICATE OF CORRECTION

PATENT NO. : 6,199,110 B1
DATED : March 6, 2001
INVENTOR(S) : Rizvi et al.

It is certified that error appears in the above-identified patent and that said Letters Patent is hereby corrected as shown below:

Drawings,
In the Drawing Sheets, replace printed FIG. 4 with the attached corrected FIG. 4.

Signed and Sealed this

Fourteenth Day of May, 2002

*Attest:*

JAMES E. ROGAN
*Attesting Officer*     *Director of the United States Patent and Trademark Office*

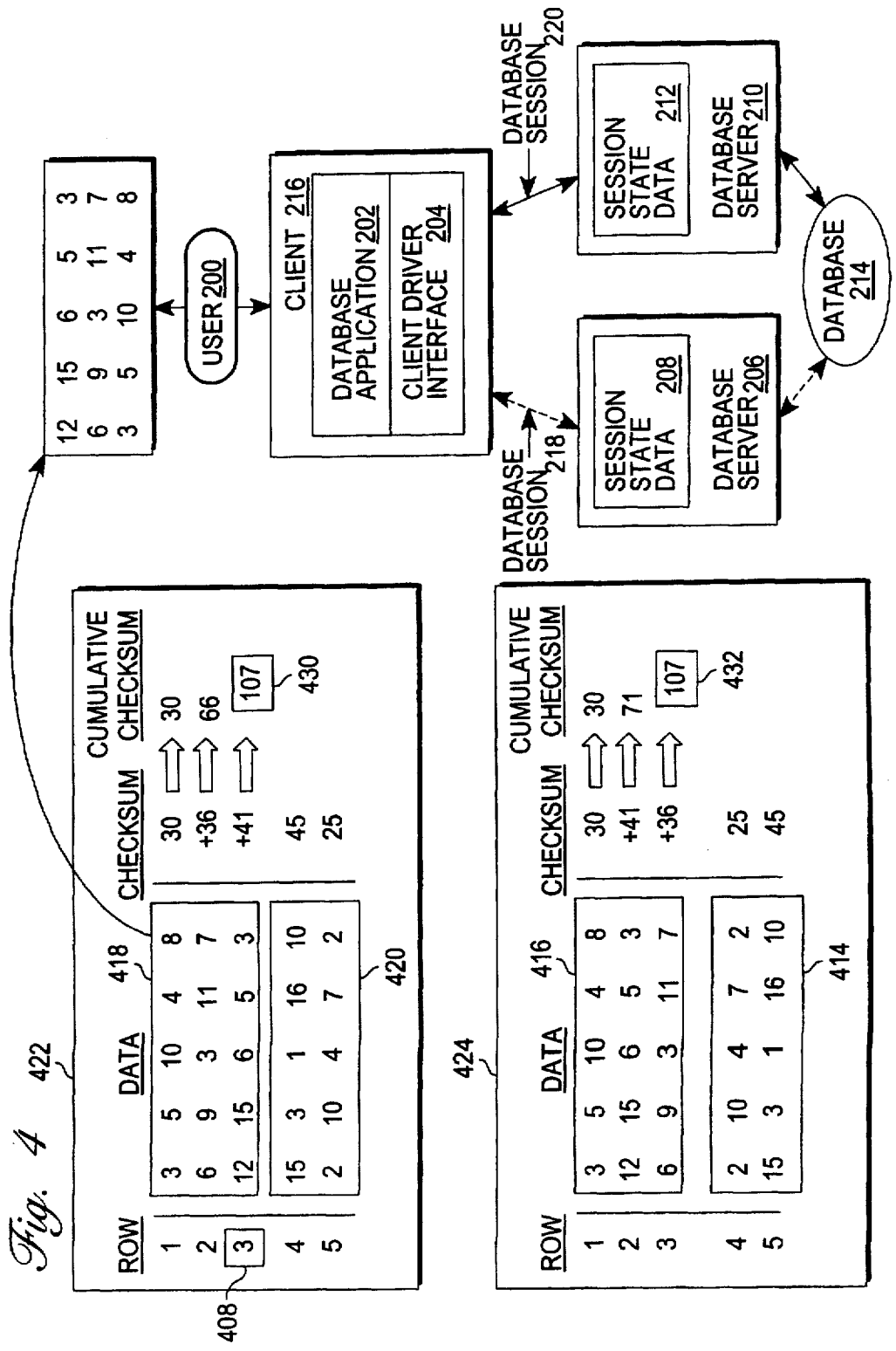

UNITED STATES PATENT AND TRADEMARK OFFICE
Certificate

Patent No. 6,199,110 B1

Patented: March 6, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hasan Rizvi, Foster City, CA; Ekrem Soylemez, Redwood Shores, CA; Juan R. Loaiza, San Carlos, CA; and Robert J. Jenkins, Jr., Foster City, CA.

Signed and Sealed this Tenth Day of December 2002.

GLENTON BURGESS
*Supervisory Patent Examiner*
Art Unit 2153